United States Patent
Sonderegger et al.

(10) Patent No.: US 6,173,289 B1
(45) Date of Patent: Jan. 9, 2001

(54) APPARATUS AND METHOD FOR PERFORMING ACTIONS ON OBJECT-ORIENTED SOFTWARE OBJECTS IN A DIRECTORY SERVICES SYSTEM

(75) Inventors: Kelly E. Sonderegger, Santa Quin; Matthew G. Brooks, Orem; Calvin Gaisford, Sandy; Damon Janis, Provo, all of UT (US)

(73) Assignee: Novell, Inc., Provo, UT (US)

( * ) Notice: Under 35 U.S.C. 154(b), the term of this patent shall be extended for 0 days.

(21) Appl. No.: 08/818,148

(22) Filed: Mar. 14, 1997

Related U.S. Application Data

(63) Continuation-in-part of application No. 08/499,711, filed on Jul. 7, 1995, now Pat. No. 5,692,129.
(60) Provisional application No. 60/013,433, filed on Mar. 15, 1996.

(51) Int. Cl.[7] ................................................. G06F 17/30
(52) U.S. Cl. ............................ 707/103; 707/9; 707/10; 707/102; 345/339; 345/356
(58) Field of Search ............................... 707/103, 9, 10, 707/102; 345/339, 356

(56) References Cited

U.S. PATENT DOCUMENTS

| | | | |
|---|---|---|---|
| 5,367,635 | * 11/1994 | Bauer et al. | 709/221 |
| 5,414,812 | * 5/1995 | Filip et al. | 707/103 |
| 5,539,870 | * 7/1996 | Conrad et al. | 395/352 |
| 5,734,905 | * 3/1998 | Oppenheim | 709/303 |
| 5,751,914 | * 5/1998 | Coley et al. | 706/47 |
| 5,781,189 | * 7/1998 | Holleran et al. | 345/335 |
| 5,838,906 | * 11/1998 | Doyle et al. | 709/202 |
| 5,929,852 | * 7/1999 | Fisher et al. | 345/335 |
| 5,931,911 | * 8/1999 | Remy et al. | 709/223 |

* cited by examiner

Primary Examiner—Jean R. Homere
(74) Attorney, Agent, or Firm—Wolf, Greenfield & Sacks, P.C.

(57) ABSTRACT

A system and method of providing associations between resources and actions in a network includes the steps of providing, in a database schema an action object class defining the structure and attributes of actions available in the network. During operation, action objects are created and stored in a database. When a user enters the system, an internal list is created at that user, identifying the resources available to that user and the action objects capable of being performed on those resources. When a user selects an resource object, the action objects associated with that resource object are displayed, the user selects the action, and the action is performed at the resource. In one example the selection of an action objects cause an associated application to be launched. Each action object represents a string of executable code. The executable code may either be hard-coded in the network software, such that action objects are created at network startup, or alternatively may be linked to the network via an external code module.

43 Claims, 10 Drawing Sheets

TABLE 1:
                        ┌256  ┌258   ┌260
  Attribute syntax:   {name:  type:  range}
                        Integer: numeric: 0..9;
     250               String: alphanumeric: a..z, A..Z;
                       bitmap: pixel;
                       executable: code;
                       platform: alphanumeric: {Windows 3.x, Windows 95};
                   ┌262      ┌264         ┌266
  Attributes:   {name: attribute syntax: flags}
                       Supported connections: integer: Read Only;
     252               Icon: bitmap;
                       action list: executable;
                       command line parameters: string;

Object Classes:        ┌268
                       {class name: string;
     254       270—super classes: string;
               272—containment classes: string;
               274—Effective flag: integer;
               276—containment flag: interger;
               278—attributes:
                          naming:—278A
                          mandatory:—278B
                          optional:—278C
                       }
                             ⋮
```

APPARATUS AND METHOD FOR PERFORMING ACTIONS ON OBJECT-ORIENTED SOFTWARE OBJECTS IN A DIRECTORY SERVICES SYSTEM

RELATED APPLICATIONS

In accordance with 37 C.F.R. §1.78(a)(3), this application claims the benefit of U.S. Provisional Patent Application No. 60/013,433, filed Mar. 15, 1996, which is a continuation-in-part of co-pending patent application Ser. No. 08/499,711, filed Jul. 7, 1995.

FIELD OF THE INVENTION

The present invention relates generally to the field of object oriented computing, and more particularly to a method for performing actions on objects in a computer network.

BACKGROUND OF THE INVENTION

Networked computer systems may be organized in a variety of configurations. In a local configuration, a number of user nodes may be coupled via a network to a central file server. In the local configuration, each of the nodes stores a local copy of all of the application programs that are available to that node. In addition, each node stores operating parameters for controlling accesses by that node to external devices such as disks and printers.

One example of a local configuration would be a number of personal computers coupled via an Ethernet link to a file server. As the personal computer is powered up, an initialization script is executed to assign printers to the print ports of the personal computer. In addition, during initialization, application programs, resident on the personal computer, are loaded and made available to a user via icons.

Because the application and operating parameters of the user workstations are stored remotely at each workstation, whenever an upgrade of an application or an update of the operating parameters is required, the upgrade and update must be made at each individual workstation. In the above example, if a printer was to become unavailable in the network, the initialization script of each of the personal computers would have to be updated to prevent assignment of the unavailable printer to a printer port of the personal computer. Thus networked configurations having applications and operating parameters stored locally are often difficult to upgrade and maintain.

Global network configurations may also include a number of nodes coupled to a file server. However, in a global network configuration, resources such as applications and printer controllers are shared by each of the nodes in the system. The resources may be distributed among different devices in the network, or stored in a central database. Access to the resources controlled by creating an object for each resource and controlling accesses to that object. An object consists of properties and the values of data corresponding to those properties. A network which uses objects to control accesses to resources is referred as an object-oriented network.

A global naming service for use in an object-oriented network is the NetWare Directory Services (NDS) database (available from Novell, Inc., Orem Utah). NDS provides a global directory containing information about all of the objects in a network, regardless of their location.

The global network arrangements facilitate upgrades and maintenance of the network. For example, because only one copy of an application exists in the global network, only one copy of the application needs to be upgraded. In addition, if a printer becomes disabled, accesses to that printer may similarly be disabled by disabling access to the printer object.

One drawback of the global naming service arises due to the number of objects that are created in the network. An object is created for each user in the network. Likewise, an object is created for each application and each resource in the network. Objects are typically organized in a hierarchical tree arrangement. When a user wants to gain access to a resource, it must first locate the resource object. Often this location step requires a time-consuming search through a large directory tree.

Often, once an object is selected, the user may want to perform an action on the object. For example, assume that one object is a printer object. A user may want to view the jobs at a specific printer. In a typical object oriented system, the user would first invoke a printer control object, capable of performing the 'view jobs' function, and then select the printer object on which it wishes to perform the action. Both the printer control object and the printer object will be stored at different locations in the directory tree, and therefore two searches will be required to perform a simple "view jobs" function. Thus it can be seen that although the global networks are more easy to maintain than the local networks, the size of the database may result in increased time delays and user frustration.

What is needed, therefore, is a means for providing an improved method and apparatus for performing actions on objects.

SUMMARY OF THE INVENTION

According to one aspect of the invention, a method for performing actions on resources in a global directory network includes the steps of storing a plurality of action objects, each action object representing at least one action capable of being performed on a resource, and forming, for each one of a plurality of users of the network, a list of associations between resources capable of being accessed by the respective user and at least one of the action objects.

According to a second aspect of the invention, a method of operating a computer system includes the steps of providing a database schema for defining classes and attributes of objects representing available resources of the computer system and modifying the schema to include a class of objects representing actions available in the computer system. Once the schema has been modified, for each set of executable codes provided by a user a corresponding action object is generated representing an action performed by the executable code. When a user enters the network, at least one action object in the modified schema available to the user is identified. In response to the identified action object and to a resource objects available to the user, a list of associations is generated. The list includes at least one action object for each resource object.

According to another aspect of the invention, a computer system having a plurality of coupled users includes a schema database for defining classes and attributes of objects representing available resources of in the computer system. A code module is coupled to the schema data base and includes a data store and a set of routines for modifying the schema to include a class of objects representing actions available in the computer system. The set of routines of the code module further includes code for generating, for each of a set of executable codes, a corresponding action object representing an action performed by the executable code. The action objects are stored in a database. Interface means, at each user, identifies, upon entry of the user into the computer system, at least one action object in the data base associated with the user. The interface means includes means for generating, responsive to the identified action object and to resource objects available to the user, a list of associations, comprising, for each of the plurality of resource objects, at least one of the action objects. At least one action icon is associated with each action object and with each resource object. Each user includes means for displaying the resource icons of the objects available to the user. Means, at each user, are provided for selecting an object by selecting the associated resource icon. In response to the selection, the action objects associated with the resource object are displayed, allowing the user to select one of the displayed action objects. Once the object is selected, the action object is invoked to cause an operation associated with the action object to be executed on the associated resource.

BRIEF DESCRIPTION OF THE DRAWINGS

To illustrate the manner in which the advantages and features of the invention are obtained, a more particular description of illustrative embodiments of the invention summarized above will be rendered by reference to the appended drawings in which:

FIG. 2B is an exemplary template for a schema definition database for defining action objects of the present invention;

DETAILED DESCRIPTION

Figure 1:
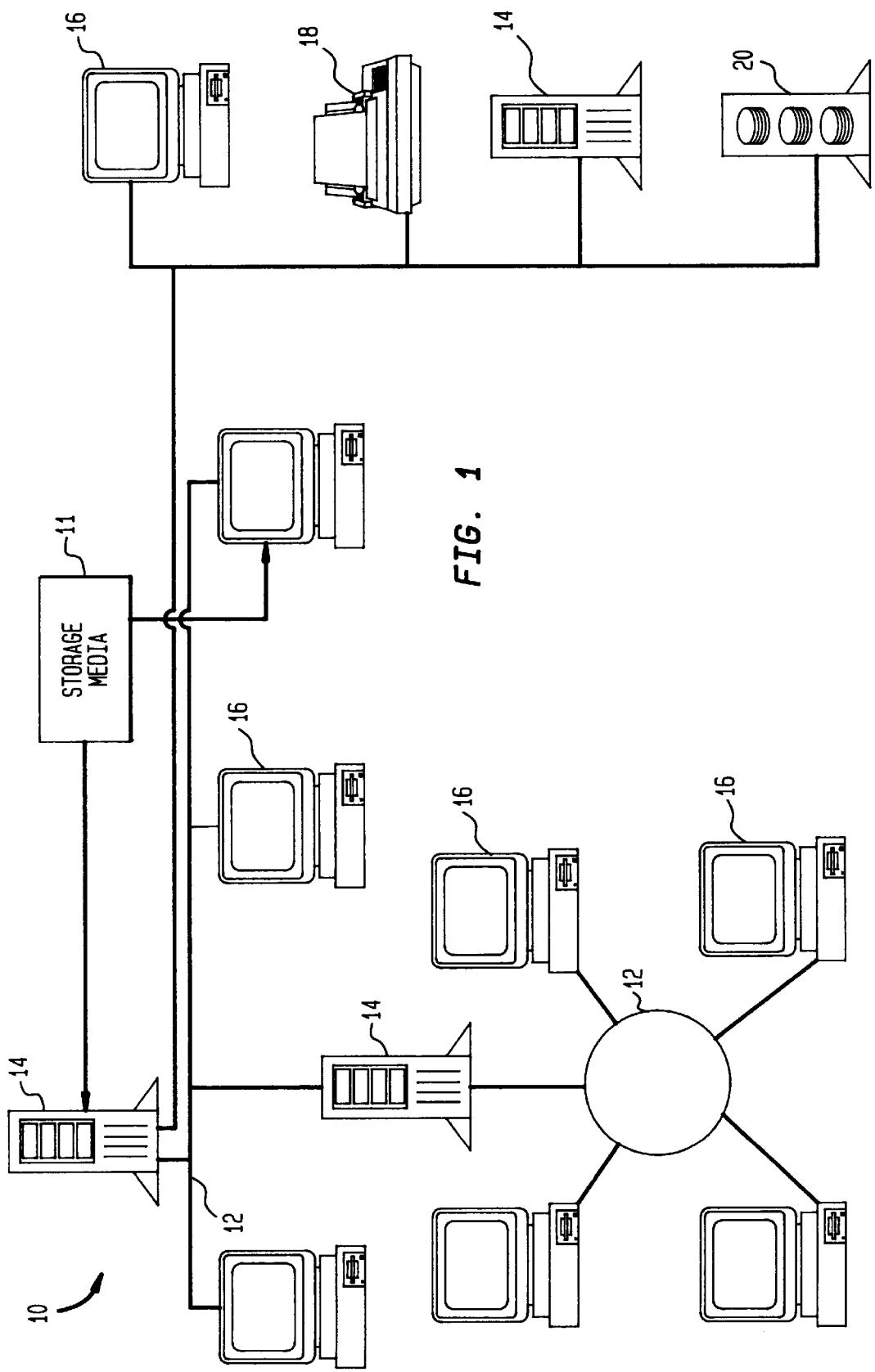
FIG. 1 is a diagram illustrating an exemplary computer network suitable for implementing the object-oriented computing of the present invention.

The present invention relates to a method and apparatus for performing actions on objects in a networked computer system that includes hardware, software, and data components. In describing the illustrative embodiments and their context, the term "code" is used to refer to a number of software components that can also be referred to as program, module, routine, subroutine, function, procedure, and por- tions of the foregoing. These terms are used interchangeably. The terms "object code," "executable code," and "executable" are likewise used interchangeably.

Reference is now made to the figures wherein like parts are referred to by like numerals. An illustrative network suited for use with the present invention is indicated generally at 10 in FIG. 1. The illustrated network 10 includes several connected local networks 12. Each local network 12 may include a file server 14 and one or more user workstations 16. A printer 18 and a storage device 20 may also be attached to the network 10. Each of the elements coupled to the network, such as file server 14 or user workstation 16, is hereinafter referred to as a "node" of the network. Although a particular network 10 is shown, the present invention is not limited in this respect, and may also be implemented in a variety of other networks.

An object-oriented approach is used to manage interactions between components in the network 10. In one embodiment, the network 10 is controlled using a global naming service such as the NetWare Directory Services (NDS) of Novell NetWare® software, version 4.xs (NetWare is a registered trademark of Novell, Inc.). The NDS provides a global directory containing information about all of the objects of the network 10. The NetWare software may be stored in a storage media 11, the storage device 20, or distributed among individual memories (not shown) of each of the other nodes in the network 10.

A variety of objects have been historically created by the NetWare software in network 10. Objects generally comprise a list of properties and the values, or data, for each of the properties. For example, a physical object may be created for each of the physical components, such as users, nodes, and devices, in the network. In addition, a logical object may be created for logical constructs, such as groups, queues, and partitions, in the network. Organizational objects may additionally be created to maintain order over the physical or logical objects in the network. An application object is further created for each application that is available in the network 10. For ease of reference, the physical, logical, organizational and application objects will be referred to hereinafter as resource objects.

According to one embodiment of the present invention, objects may also be created for each action that may be performed on the resource objects. Objects created to perform actions on other objects are hereinafter referred to as action objects. Each action object includes an executable code that may perform one or more tasks on a resource objects of a given type. For example, a given resource object that is a printer may have associated therewith an action object having an executable 'view print queue'. One or more action objects may be associated with a given resource object. By defining actions as objects, and forming associations between action objects and the resource objects on which they can act, an improved method of performing actions on objects can be provided as described below.

Before describing the generation and use of action objects in the network 10, a brief description of the NetWare software used to control the object oriented network 10 will first be provided. It should be understood that other object-oriented software architectures may additionally be used in accordance with the concepts put forth below.

Figure 2A:
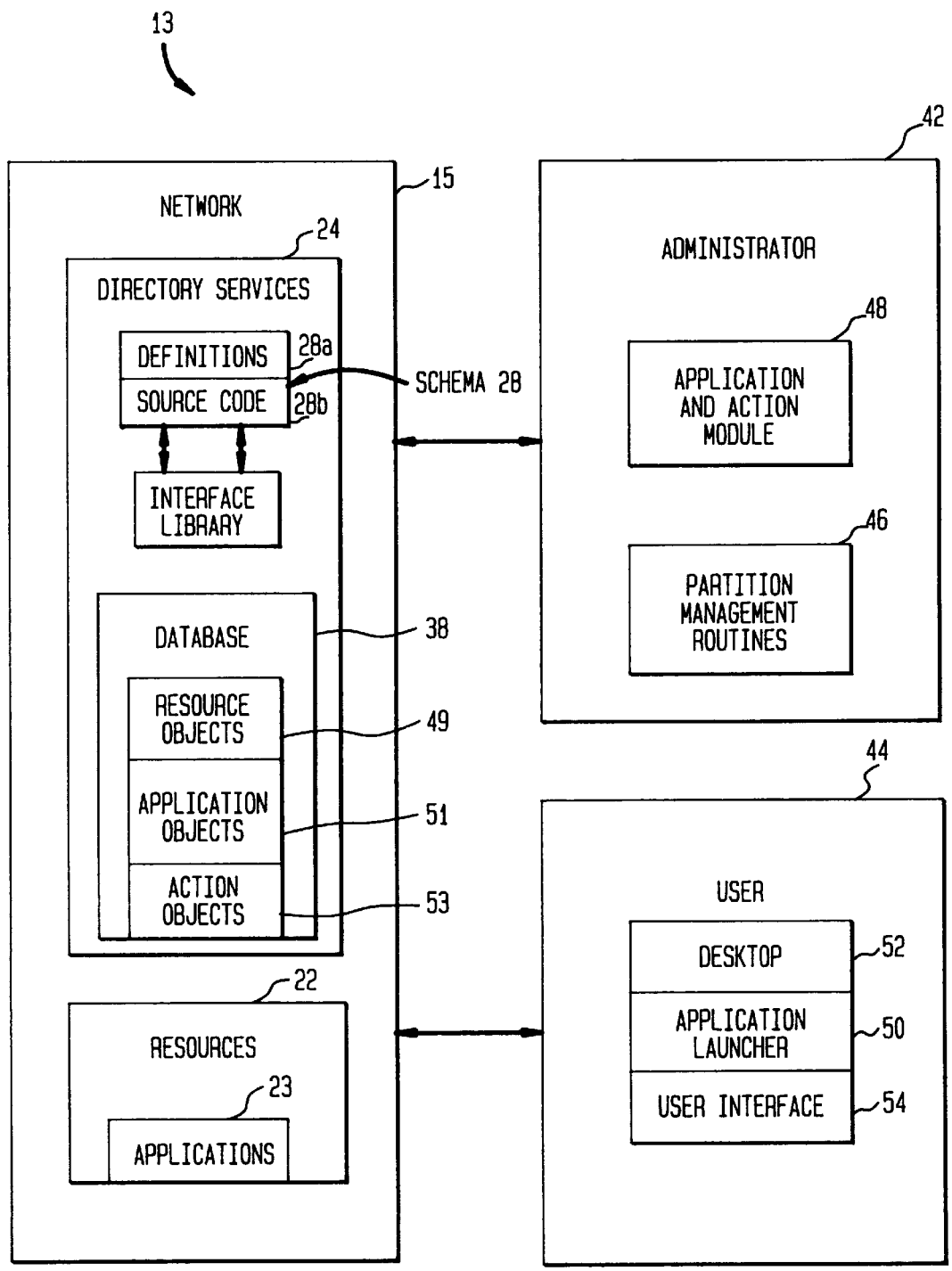
FIG. 2A is a block diagram of the address space of the computer network of FIG. 1 illustrating network, administrator and user tools employed in conjunction with the computer network of FIG. 1.

With reference to FIG. 2A, administration and use of the network 10 is governed by network software that executes on the hardware components of FIG. 1. The software resides in an address space 13 of the network. The address space 13 corresponds to the available memory in the computer system, which is distributed among one or more storage devices. Suitable storage devices include floppy disks, hard disks, tape, CD-ROMs, and other computer usable media. Each storage device is readable by one or more of the file servers 14 (FIG. 1) and/or user stations 16 (FIG. 2A).

The address space 13 represents the total addressable memory locations available to one or more nodes coupled to the network. According to the NetWare architecture, address space 13 is apportioned into a number of sub-spaces, such as network address space 15 and administrator address space 42. In addition, the address space 13 also includes a user address space 44 for each of the user coupled to the network. User space 44 is a dedicated address space.

The network address space includes directory services software 24. The precise nature of the directory services software varies among different networks but in general directory services software 24 monitors the use of the resources (e.g., which user node is currently using each of the resource objects) and the rights of users to use the resources. In one embodiment, the directory services software 24 includes services provided by NetWare Directory Services ("NDS") software that is commercially available from Novell, Inc. of Orem, Utah (NetWare Directory services is a trademark of Novell, Inc.).

In the embodiment shown in FIG. 2A the directory services software 24 includes an interface library 34, and a database 38 having a logical structure represented by a schema 28. The schema 28 comprises a definitions database 28a that specifies the permissible classes and properties (also referred to as attributes) of all of the resource objects available in the network 10. The schema 28 additionally includes source code 28b that is used for generating objects based on the schema definitions 28a as is described in more detail below. An example template for the schema definition database 28a is provided in FIG. 2B.

Each object that is created in the network belongs to a certain class of objects. Each class of objects has certain properties, or attributes. The schema defines the available class types and available attributes for each object that is created. As shown in FIG. 2B, the schema 28 includes a set of attribute syntax definitions 250, for defining the formats of each of the attributes. Each attribute syntax in the schema 28 is specified by an attribute syntax name 256, a type 258 and optionally a range of values 260 that can be assigned to attributes of the given attribute syntax type. Attribute syntaxes thus are analogous to data types such as integer, float, string, or Boolean in conventional programming languages. Specific examples of attribute syntax types are provided in FIG. 2B.

The schema 28 also includes a set of attribute definitions 252 for defining properties that are available during creation of an object. Different objects may have the same attributes, with the attributes having different values. Each attribute in the schema 28 has an attribute name 262, an attribute syntax type 264 (selected from the available attribute syntax definitions 250), and optionally a number of flags 266. The attribute name 262 identifies the attribute, while the attribute syntax 262 limits the values that are assumed by the attribute. For instance, the schema 28 includes an attribute of syntax type integer having the name "supported connections" which specifies the number of concurrent connections the associated object representing the file server allows.

Each attribute may also have associated with it any or all of the following flags 266: Non-removable, Hidden, Public Read, Read Only, Single-Valued, Sized, and String. The Non-removable, Hidden, Public Read, and Read Only flags are generally used for controlling access to the attribute. The general meanings of these flags are familiar to those of ordinary skill in the art of object oriented programming. If the Sized flag is set for a given attribute, then upper and lower bounds (possibly including no limit) are imposed on values currently held by that attribute.

The schema 28 further includes a set of object class (also known as class) definitions 254 for identifying the various types of objects. The basic structure of a class definition is shown in FIG. 2B. Object classes may include, for example, an application class, a printer class. In addition, according to one embodiment of the present invention object classes may also include action classes. An object is an instance of a class. Thus an action object is an instance of an action object class, a printer object is an instance of a printer class, and an application object is an instance of an application class. Listed for each class in the object class definition 254 section of the schema definition database 28a is a number of properties of the objects in that class, including the object name 268, flags 274–276, and attributes 278.

More specifically, these properties include a class name 268, which identifies this class, a set of super classes 270 that identifies the other classes from which this class inherits attributes, and a set of containment classes 272 that identifies the classes permitted to contain instances of this class. Each object class also has a container flag 276 and an effective flag 274. The container flag 276 indicates whether the class is a container class, that is, whether it is capable of containing instances of other classes. The effective flag 274 indicates whether instances of the class can be defined. Non-effective classes are used only to define attributes that will be inherited by other classes, whereas effective classes are used to define inheritable attributes, to define instances, or to define both.

In addition, each class in the schema 28 includes a list 278 of attributes of the class. The attributes of the class are selected from the available attributes identified in the attributes definition portion 252 of schema definition database 28a. As each class may have a different class name, each class may also have different attributes associated with that class. Naming attributes 278a of the class are used to identify permissible names for objects of that class. Mandatory attributes 278b of a class are those attributes that must exist in each valid instance of the class and become mandatory attributes of classes which inherit from the class. The optional attributes 278c of class are those attributes that may, but need not, exist in each valid instance of the class. Thus objects in a common class will have all the same mandatory attributes, but their optional attributes may vary.

The schema definitions database 28a retrieved from memory during initialization of the network. The source code 28b of the schema generates objects in response to commands from the administrator software 42 and in accordance with the object class and attribute definitions set forth in schema database 28a.

According to one embodiment of the invention, the schema database may be modified after initialization to include additional action class definitions and attributes. The schema 28 is an API-extensible schema. As such, the attributes and object classes of the schema definition database 28a may be modified using Application Programmer's Interface (API) routines, known to those of skill in the art, without direct access to the source code 28b of the schema. That is, the definition database 28a may be modified and additional routines may be linked to schema without effecting the source code 28b. Control over the modification of the schema database 28a and the linking of the external routines is performed by an interface library 34, coupled to the schema 28.

Figure 3:
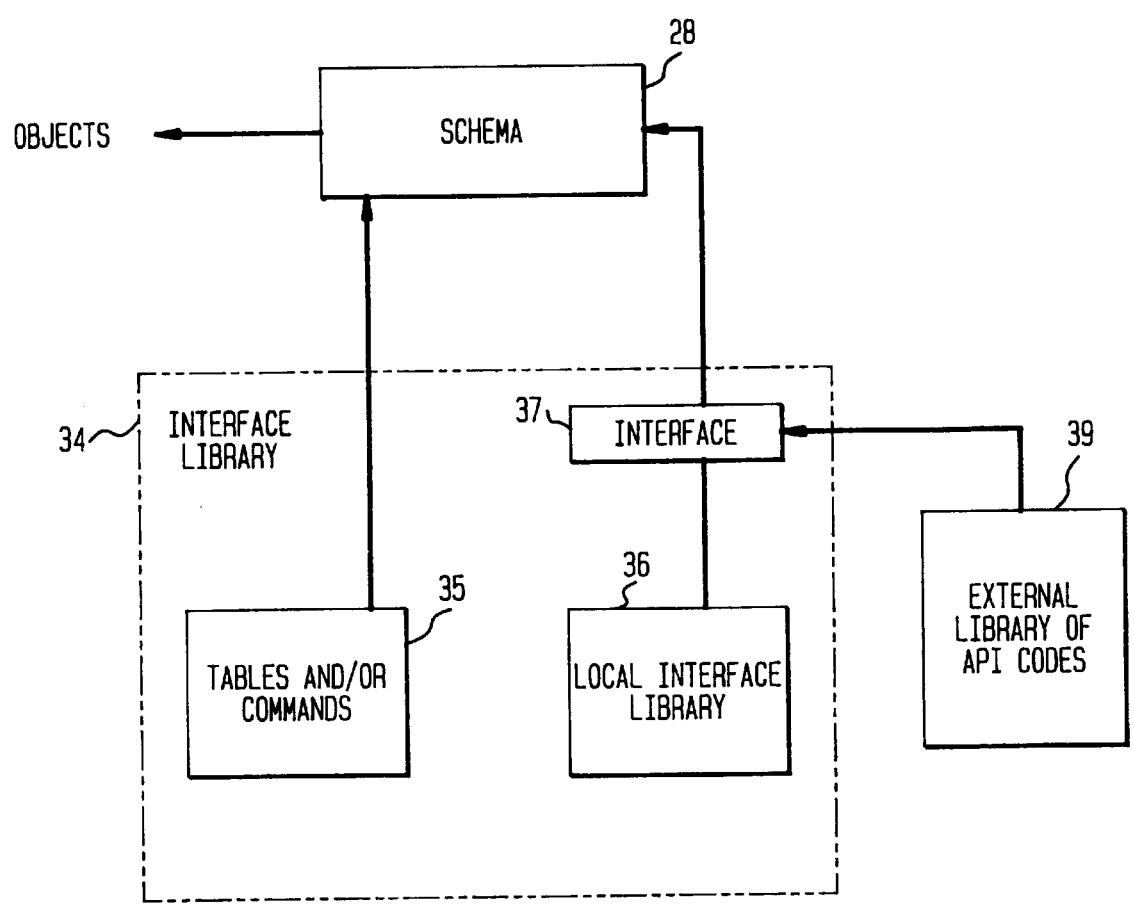
FIG. 3 is a block diagram illustrating an interface library used during creation of action objects in the present invention.

Referring now to FIG. 3, a block diagram of the interface library 34 is shown. The interface library serves two purposes. First the interface library may be used for storage of tables or commands 35 that are used by the schema 28b source code during the generation of objects. Thus, in this capacity, the interface library 34 serves as a data store. Second, the interface library 34 may also include a local interface library 36, storing a set of API routines that may be invoked by the administrator software 42 or user software to access and modify the schema database 28 and to thereby provide additional functionality to the schema. Communication between the local interface library 36 and the schema 28 is managed by interface 37. In addition, or alternatively, the interface 37 may provide an interface between the schema 28 and an external library 39 of API codes that may be invoked by administrator software or user software. One example of an external library of API codes is, for example, an NWDSxxx() library which is commercially available from Novell, Inc. of Orem, Utah, although any other API library may also be used.

Referring back to FIG. 2A, in addition to the schema 28 and the interface library 34, the directory services software 24 additionally includes a database 38. The database 38 stores the data for each of the objects created by the schema. The database 38 includes resource objects 49 including printer objects, file server objects, and application objects 51. According to one embodiment of the present invention, the database 38 additionally stores action objects 53.

Application objects are instances of the application class, and are created for each application executing in the network 10 to make application programs available to users. The application object may include, for example, information as to what parameters are needed to launch the associated application, and what syntax those parameters must have when provided to the application. Application class definitions were not historically provided in the schema definition database 28a. One method used to modify schema 28 to include an application class and application management routines, and thereby provide for the existence and management of application objects is disclosed in parent patent application Serial No. 08/499,711, filed Jul. 7, 1995 entitled METHOD AND APPARATUS FOR MANAGING APPLICATIONS IN A NETWORK, invented by Sonderegger et. al, and incorporated herein by reference in its entirety, now U.S. Pat. No. 5,692,129.

In one embodiment of the invention, the action object 53 is provided to facilitate the execution of tasks on resource objects 49 by associating one or more tasks (represented by action objects) with each resource object. Each action object includes an executable code, or a pointer to an executable code capable of performing one or more tasks on a resource object. The executable code may be a portion of code from an application that executes a specific task. Alternatively, the action code may point to an entire application. Each action object is contained by an application object, and thus inherits all of the mandatory attributes of the corresponding application object. Thus, the attributes of the application object that identify how to launch the application are inherited by the action object.

As mentioned above, an action object is associated with a resource object. By providing a link between the resource and the available actions that may be performed on the resource, the delays and frustration formerly encountered as the global network directory was searched may be eliminated.

Thus the directory service software 24, includes software tools and data storage for generating, storing, and managing objects in the network. Network address space 15 additionally includes resource address space 22. The resource address space 22 may be apportioned into a number of sub-spaces, one for each resource (printer, disk array, etc) in the network. In addition, the resource address space 22 may be further apportioned into a number of application address sub-spaces, such as application address sub-space 23. Each of the sub-spaces of resource address space 22 are used as dedicated locations for storing data that may be transferred between hardware elements in the network during operation of the resource or application.

The administrator address space 42 stores software programs and data that are used to manage and maintain the network. For example, administrator tools address space 42 includes application and action code module 48 and partition management tools 46. The application and action code module 48 of one embodiment of the invention is used for controlling the generation and management of action object classes and is added to existing administrator tools during network initialization as will be described later herein.

The user tools address space 44 includes an application launcher 50 for initiating execution of applications 23 through their corresponding application objects 49. In addition, according to one embodiment the present invention, the user tools include user interface software 54, which operates in one embodiment of the invention to facilitate the use of action objects 53. More details on the operation of the user tools is provided below.

Figure 4:
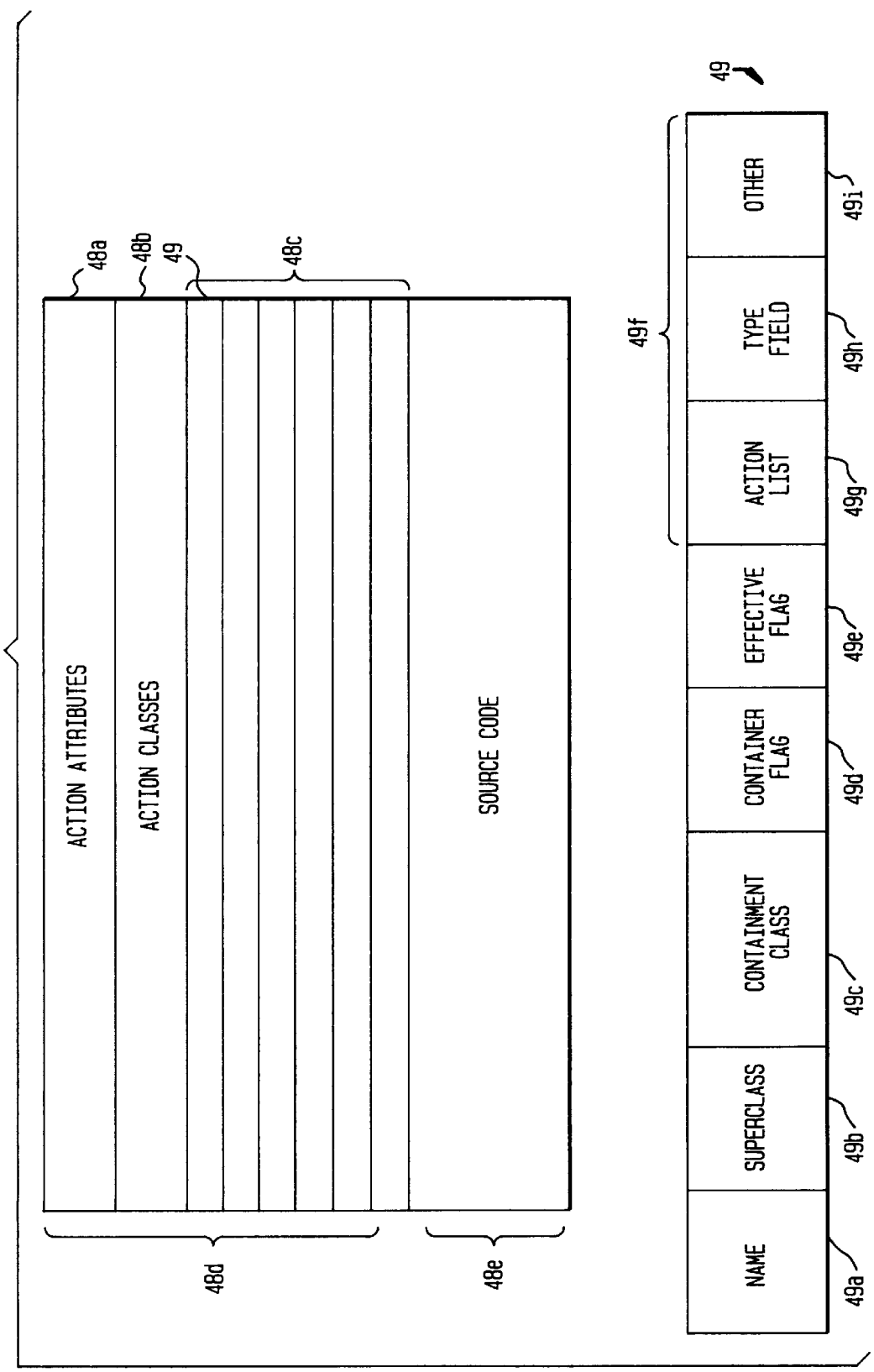
FIG. 4 is a block diagram of one embodiment of a source code module for creating action objects according to the present invention.

FIG. 4 illustrates an application and action code module 48, which is also referred to herein as a "snap-in", since it is added to the base system software of the network and stored in administrator tools address space 42. A portion of the application and action code module 48 is shown apportioned into a database segment 48d and a source code segment 48e. A database segment 48d of the module 48 stores all of the attributes 48a and the action class definitions 48b for each of the action objects to be provided in the network. In addition, the database segment 48d of the code module 48 includes the data 48c required for creation of action objects. The data 48c is stored as a series of entries, each entry including a class name 49a, which identifies this class, a set of super classes 49b that identifies the other classes from which this class inherits attributes, and a set of containment classes 49c that identifies the classes permitted to contain instances of this class. Each entry also stores a container flag 49d and an effective flag 49e. The container flag 49d indicates whether the class is a container class, that is, whether it is capable of containing instances of other classes. The effective flag 49e indicates whether instances of the class can be defined. The entry also a number of attributes 49f. The attributes include an action list attribute 49g, which is an executable code or a pointer to an executable code capable of performing one or more actions. The attributes also include a type field 49h for indicating on what type of resource object the action object may act. A number of other attributes 49i may also be provided for defining the action object, as will be described in more detail below. Thus each entry stores the data required for the creation of one action object.

In one embodiment, the action attributes 48a, action class definitions 48b and action object data entries 48c are provided by an external programmer. The determination as to which executable code segments are to be stored as action objects in the network may be made based on the frequency with which that code segment is executed, the size of an application associated with the executable code, or the flexibility that the inclusion of the executable code may provide. For example, if an application is very large, but a certain function of that application is run frequently, the executable code that runs that function of the application may be stored as an action object. Thus, when that function needs to be performed, a short portion of code can be invoked, without necessitating the overhead of invoking the large application.

The source code 48e of the code module 48 includes a library of routines that allows for the generation and management of application and action objects. In addition, the source code may also include executable files that are pointed to by the action objects in the database of the snap-in module. Thus, in one embodiment of the invention, the snap-in module may be used to add additional functionality to the network by providing executable routines that may be invoked by associated action objects. Accordingly, application objects may be used to increase the capabilities of the network.

Figure 5:
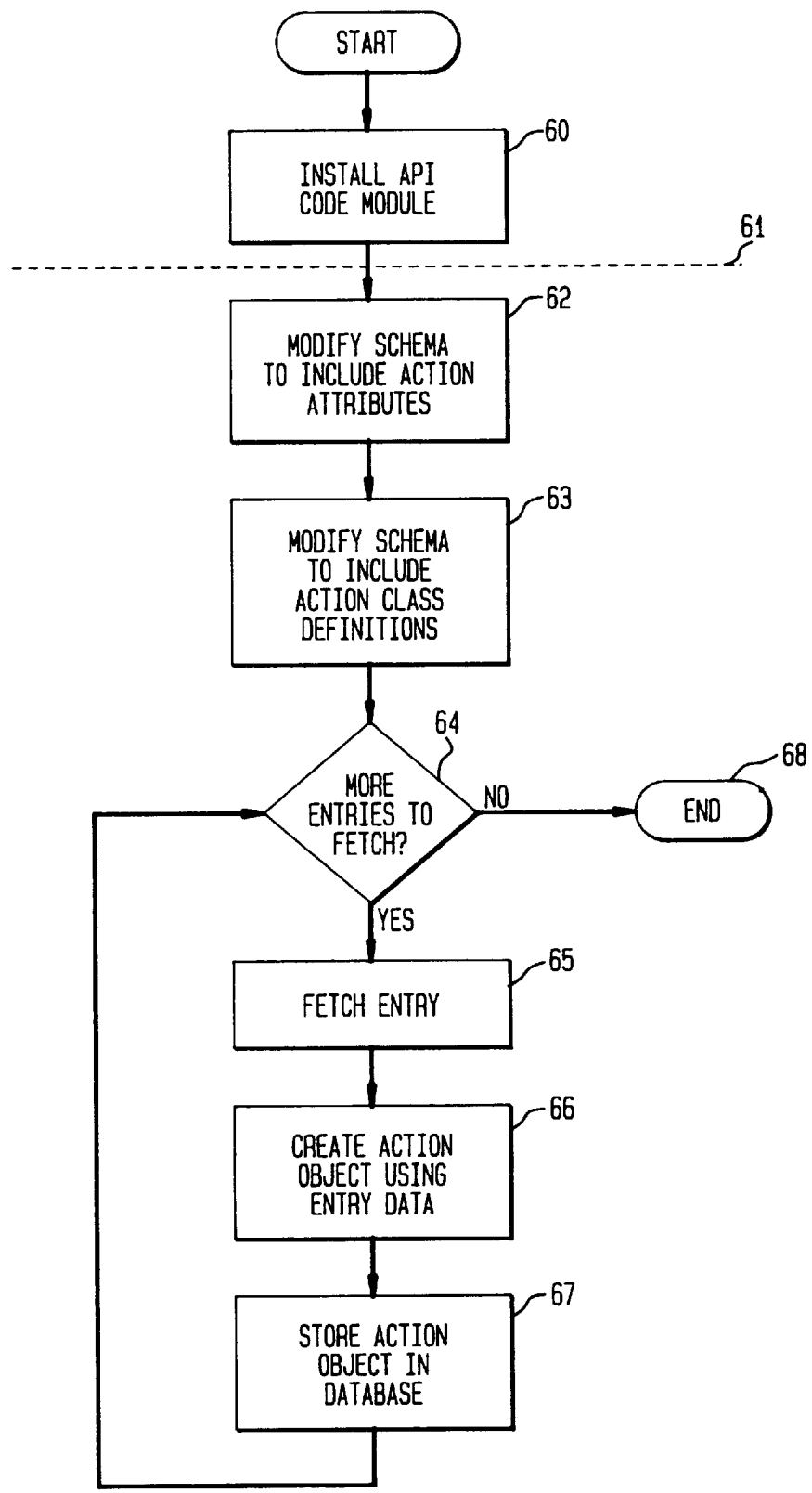
FIG. 5 is a flow diagram illustrating the steps of generating an action object according to the present invention.

In FIG. 5, a flow diagram is provided that illustrates the manner in which an action object can be created in accordance with one illustrative embodiment of the invention. At step 60, following initialization of the network, the application and action snap-in code module 48 is installed by an operator into the administrator tools software of the network address space 13. During installation of the snap-in module, as described above, the action classes, action attributes, and execution codes are stored in a database 48d. The source code 48e of the module 48 comprises a number of API routines.

In one embodiment, the loading of the snap-in module may be achieved by registering each of the procedures in the snap-in module with the administrator software. For example, in an embodiment using NetWare software, the standard function call NWARegisterObjectProc() is called to register new routines. The routines that are registered with the administrator may include, for example, a routine for controlling the transfer of messages between the snap-in code and the administrator code during creation of action objects, a routine for managing for the allocation of memory for storing action objects, and routine for updating the schema to include a number of action classes and action class attributes, and a routine for creating action objects using the data entries 48c stored in the data portion 48d of the snap-in module.

At step 62, after the snap-in routines are registered with the administrator, the software routines of the snap-in module 48 begin the process of communicating with the interface library 34 to modify the schema 28a to include action classes. A dashed line 61 in FIG. 5 delineates the task of installation performed by an external operator and the tasks executed in software by the source code 48e of the snap-in module.

As mentioned above, the interface library 34 may use routines that are provided in the snap-in module, via the interface 37 (FIG. 3) to manage the update of the schema. The interface 37 also makes routines provided by the snap-in module available to the source code 28b of the schema. At step 62, the schema definitions database is modified to include the additional action attributes 48a provided in the snap-in module data portion 48d by copying the attribute definitions from the snap-in module 48 to the schema definitions database 28a via interface library 34. At step 63, the object class 254 definitions of schema definitions database are augmented to include the action class definitions 48b stored in the data portion 48d of the snap-in module 48 by copying the class definitions from the snap-in module 48 to the schema definitions database via interface library 34.

The administrator software in conjunction with the source code 48e of the snap-in module then begins the process of generating action objects that may act upon resource objects in the network. At step 64 it is determined whether there are any entries in the series of data entries 48c that need to be processed. If there are no entries, then the process concludes at step 68. If there are entries in the series of data entries 48c that need to be processed, then at step 65 an entry is fetched from the sequence of data entries 48c. At step 66, an action object is created for the fetched entry, with the action object having the values specified in the name, superclass, containment class, container flag, effective flag, executable code, type and other attributes of the entry. At step 67, each created action object is stored in the directory services database 38. The process of reading an entry from the series of entries 48c in the data portion 48d of the snap-in module 48 continues until it is determined at step 64 that there are no more entries to be processed.

Although the above steps illustrate a method for adding action objects to a network database after the network has been initialized, it should be understood that alternatively the action objects may be hard coded into the network software. In such a case, upon network initialization, the available system action objects would already be defined and an external snap-in module would only be needed for providing additional action objects to the network.

Figure 6B:
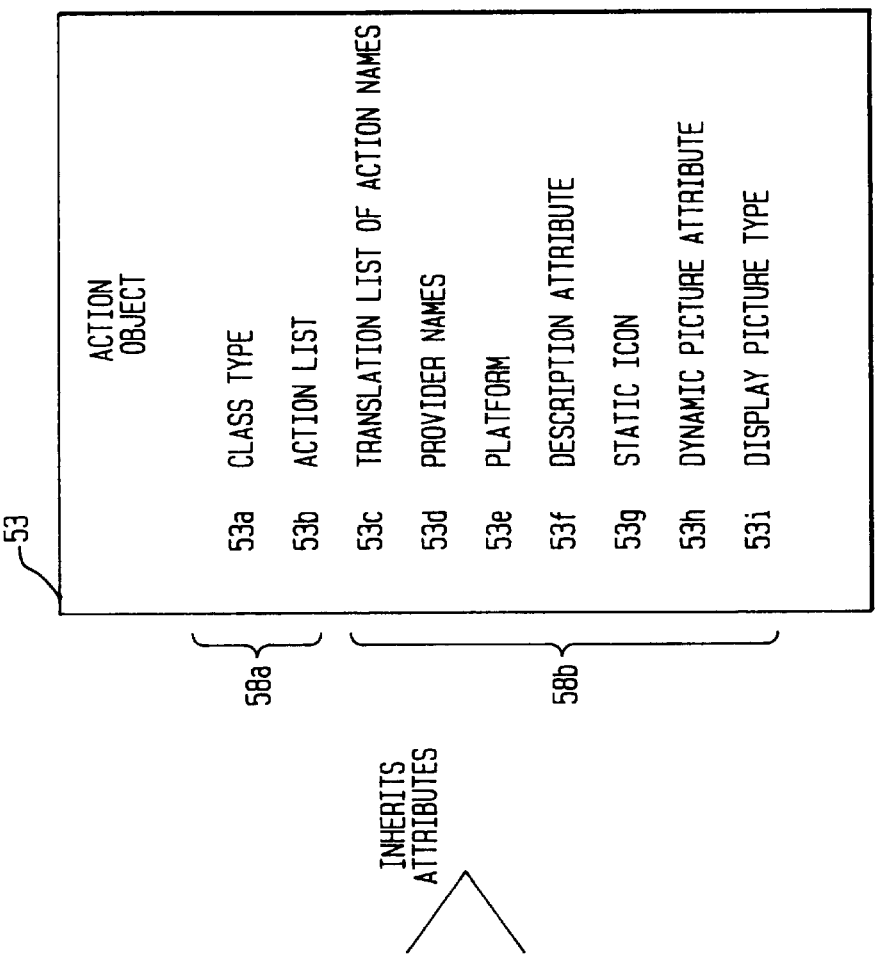
FIGS. 6A and 6B illustrate example embodiments of an application object and an action object according to the present invention.
Figure 6A:
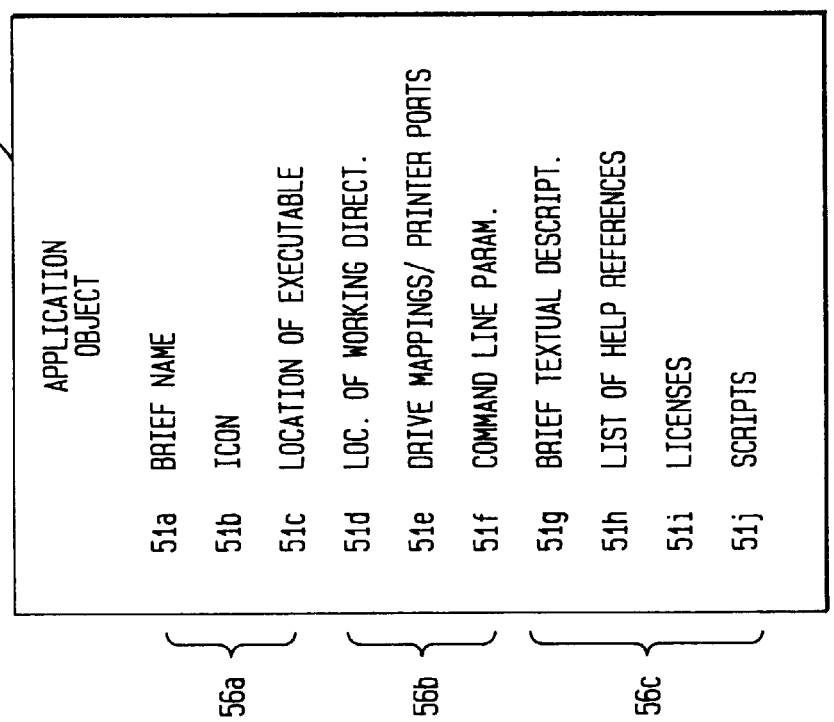

As mentioned above, the action objects are contained by application objects, and as such inherit attributes from the application objects specified in the superclass field of the action object. Referring now to FIGS. 6A and 6B, diagrams of example attributes for an application object 51 and an action object 53 are provided. In FIG. 6A, the application object 51 includes identification attributes 56a, execution attributes 56b, and miscellaneous attributes 56c. The identification attributes 56a include a brief name 51a which textually identifies the application and an icon 51b which graphically identifies the application. The execution attributes 56b identify where the application is located, how it is initiated, and further identify the operating requirements of the application. The execution attributes 56b thus include the location of at least one executable code 51b for the application in question, the location 51d of the application's working directory, the drive mappings and printer port captures 51e used by the application, and the command line parameters (if any) 51f that should be passed to the application when it begins execution. The application object may also include miscellaneous attributes 56c that may provide an ease of use of the application. Such attributes may include a brief textual description 51g of describing the application to potential new users, a list 51h of other users who can be contacted to answer questions about the application, licensing information 51i, and scripts 51j to run before and/or after execution of the application.

As shown in FIG. 6B, in one embodiment of the invention, the action object 53 inherits all of the attributes 51a–51j from the application objection 51. It should be understood, however, that this is not a requirement of the invention and that an action object may be alternatively provided including attributes required to allow the action object to independently execute an application.

FIG. 6B illustrates an example attributes that may be included in an action object 53. The action object 53 is shown here to include operation attributes 58a and identification attributes 58*b*. The operation attributes of an action object include a class type 53*a*, for identifying the type of objects on which the action can execute and an action list 53*b*, comprising a list of executables that can be invoked by this action object.

The identification attributes include a translation list 53*c* of action names, for keeping track of action object name aliases, and a provider name attribute 53*d*. The provider name attribute 53*d* takes as its value the provider name or company name of the company that wrote the executable code that performs the action. There is a possibility that different action objects 53 define identical actions, but are performed with different executable codes. The provider name attribute 53*d* in the action object 53 is used to differentiate between the two executable codes. Other identification attributes include a description attribute 53*f*, providing a brief description of the actions available under the action object and a static icon attribute 53*g*, providing a bitmap image associated with the action object. In addition, a dynamic picture attribute is provided. A dynamic picture attribute 53*h* provides a bitmap image which may be updated during operation, or which may be a static icon. In addition, a display picture type attribute 53*i* is associated with each action object. The display picture type attribute 53*i* indicates whether the dynamic picture attribute is an icon or a non-icon attribute. The syntax of the value of the display picture type attribute 53*i* is defined as an integer. Resource objects may also include a static icon attribute, a dynamic picture attribute and a display picture type attribute.

Another identification attribute of the action object 53 is a platform attribute 53*e* which takes as its value an indication of the operating system platforms on which the actions can be performed. Suitable platforms include for example the Windows 3.x platform, the Windows 95 platform, the Windows NT platform, or the OS/2 platform. It will be appreciated that the platform attribute 53*e* may be defined to specify other platforms.

Each action is associated with an object identifier in a one-to-one correspondence. For example, an action object may define two actions: send e-mail and view picture. Each of these actions may be performed on a user object. Thus, there is an executable code that when invoked, can either send e-mail to a particular user, or display a particular user's picture. Alternatively, one action may be performed on multiple objects of the same type.

Action objects reduce delays associated with searching a large directory base by associating actions with a given resource object. Note again that resource objects are meant to include physical objects (such as devices or users), logical objects, and organizational objects. There may be a variety of tasks that can be performed by a given resource object. According to one embodiment of the present invention, an action object is provided for each of the tasks that can be performed by the resource. An association is created between the resource and the available tasks. Thus, when a resource object is selected, the tasks that can be performed by the resource object may be displayed by displaying the group of associated action objects. Thus action objects may be used to provide an enhanced user interface that reduces the time delays and frustrations associated with searching the global database.

Figure 7A:
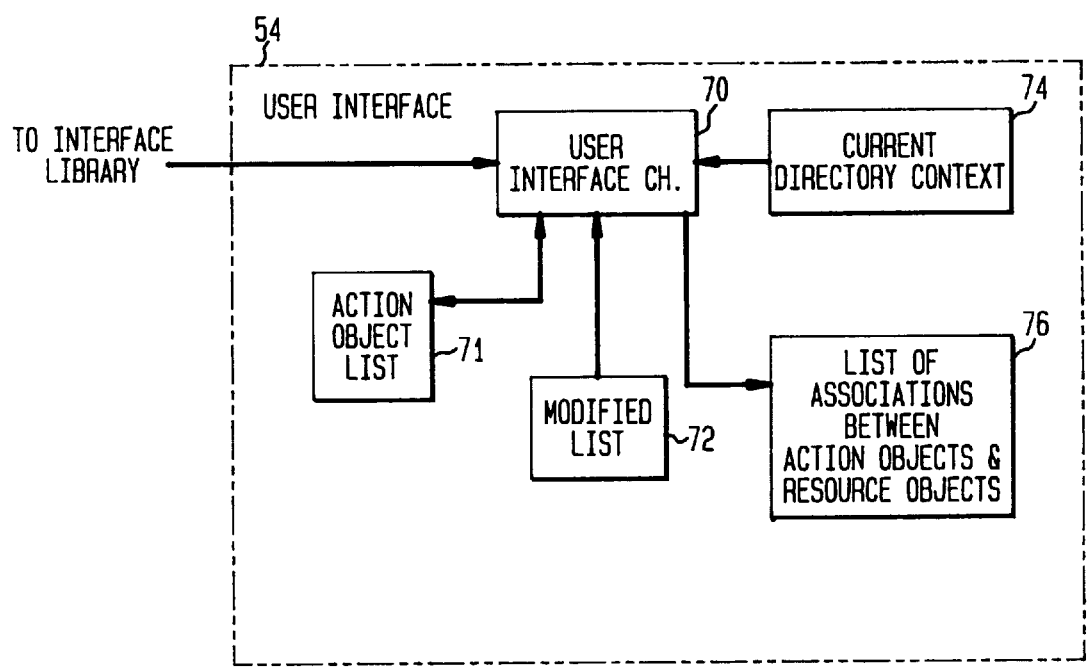
FIG. 7A is a diagram illustrating components of a user interface for storing and maintaining action objects in the present invention.
Figure 7B:
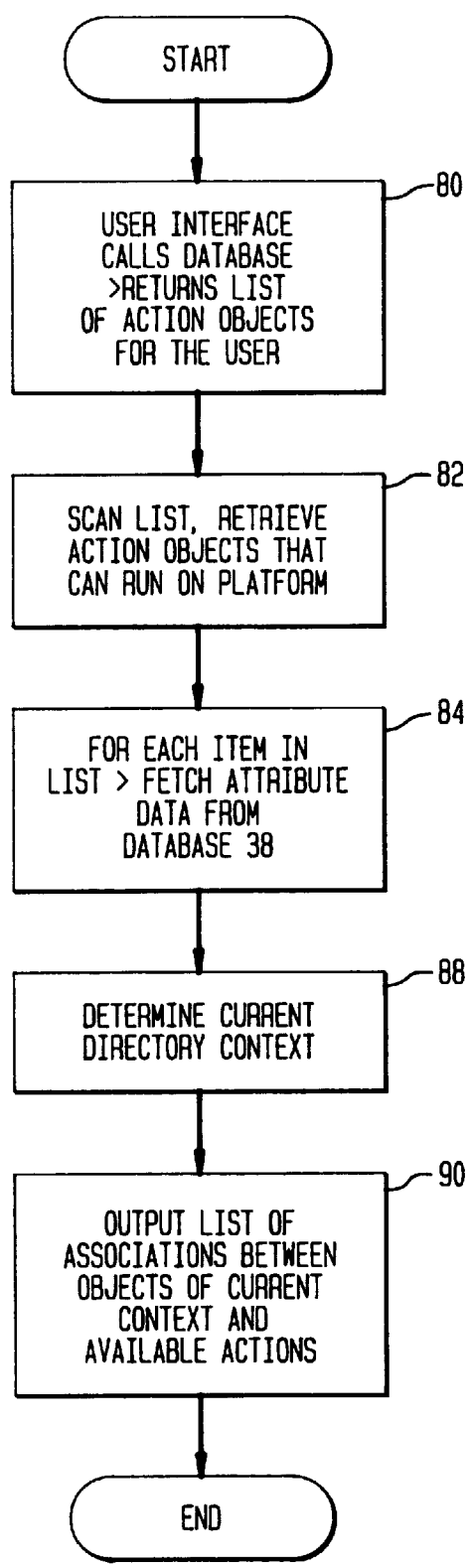
FIG. 7B is a flow diagram illustrating the use of the components of FIG. 6A for identifying and storing action objects at the node according to the present invention.

Referring now to FIGS. 7A and 7B, a block diagram and flow chart, respectively, are provided for illustrating the steps used when a user enters the network for determining the selection of actions objects that are to be made available at the user. FIG. 7A is a block diagram illustrating basic components of the user interface 54 that are used for tracking action objects. Interface control 70 operates at the user interface 54 for controlling data transfer between the user and directory services software 28. A list of action objects 71, retrieved from the database 38 (FIG. 2A), stores a subset of data for each action object available to the user. The subset of data identifies certain operating characteristics of the action object. For example, the subset may include the name of the action object for identifying the object, the platform attribute of the object for determining whether the action can be executed on the user's platform, and the class attribute for identifying on what types of objects the action may be performed. The user interface also includes a modified list of action objects 72. This list is generated at the user using the list 71 and information about the user. The modified list of action objects 72 stores, for each action object, all of the attributes of the action object shown in FIG. 5.

A current directory context table 74 is coupled to the user interface software 70 and stores the current operating context of the user. A user may operate in either a user, group, organizational unit, organization or country context. The user interface software stores information about all of the resource objects available to each user for each operating context. An internal list of associations 76 is generated by the user interface software 70. The internal list of associations provides links between the resource objects identified by the user interface software and the action objects stored in the action object list 72.

Referring now to FIG. 7B, the generation of the internal list of associations will now be described with reference to the components identified in FIG. 7A. At step 80, when the user first links into the network, the user interface software 70 calls directory services software 24(FIG. 2A), which returns a list 71 of action objects available to that user from database 38. At step 82, the user interface software 70 compares each of the action objects in the received list 71 to determine whether the action object can execute on the platform of the user. All of the action objects capable of executing on the platform are moved to modified list 72. At step 84, for each entry in the modified list 72, the data base is accessed and the remaining attribute data for each action object in the modified list 72 is retrieved and stored with the corresponding action object in the modified list 72.

At step 88, the current directory context 74 is examined by user interface software and searched for resource objects. The resource objects, as described previously, have a type field associated therewith. The type of the resource object will be compared against the modified list 72 to identify action objects capable of acting on resource objects of that type. Resource objects not associated with actions are ignored. A cross -reference between resource objects and action objects capable of acting on the resource object is provided as internal list 76. The internal list stores pointers to objects in the current directory, and pointers to the action objects in the list 72. Note that the internal list provides mappings for all of the resource objects available to all operating contexts at the user. Thus, when a context is changed, the mappings have already been determined and the display of objects associated with the new context is facilitated.

Figure 8:
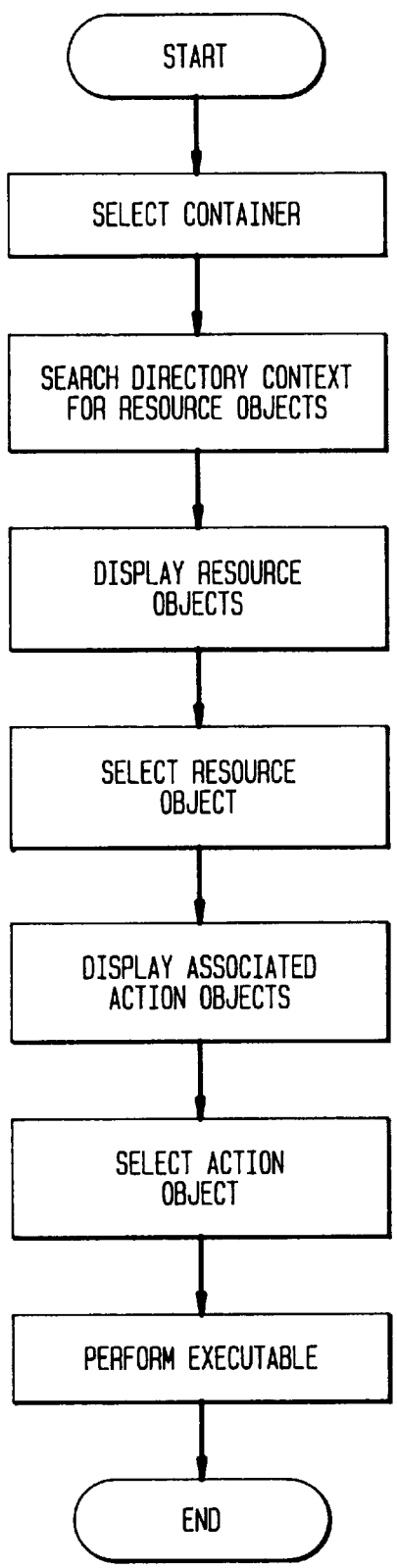
FIG. 8 is a flow diagram illustrating a method according to the present invention of selecting objects and displaying and executing associated action objects.

Referring now to FIG. 8 a flow chart outlining the steps followed by a user to perform an action on an object in the database is generally designated at 110. At step 116, a container representing the current operating context of the user is selected by the user. Examples of containers include organizational units, organizations, and countries. Each container may have access to one or more resource objects. For example, in the organizational unit container, there may be several user objects corresponding to the members of the organizational unit. In one embodiment a container is selected having at least one resource object. There are various ways for a user to select a container. One way is by using an input device such as a mouse to click on a displayed container icon. The container selected in step 116 may be the same as the current operating context of the user. In one embodiment, a default container is the container in which the object associated with the current user resides.

At step 118, once the desired container is selected, the user interface searches the directory context associated with the current container for resource objects. If there is a resource object in the directory context, but there is no action in the modified list 72 that can be performed on the type of resource object, the resource object is ignored. At step 200, the resource objects for which there is an action object in the list that can be executed are displayed to the user. The action objects may be displayed via an icon, a pull-down menu, or some other visual display method.

It will be appreciated by those with skill in the art that there are different ways to find and select a resource object within a container. If there are many resource objects in the current container, the user may manually browse for an object. Additionally, the user interface or other device may provide a search vehicle to find a resource object. The search vehicle may query the user for resource object criteria and display every resource object in the container that matches the criteria. In another embodiment, an index of resource objects may be maintained and the user may search the index for a particular resource object.

Each time a user moves to another container and the resource objects upon which an action in the list can be performed are determined, the user interface or other device or application checks each resource object to determine if the resource object has a static icon associated therewith. In one embodiment, this information is stored in an icon attribute of the resource object. If there is a static icon associated with the particular resource object, this static icon is displayed to the user. If there is not a static icon associated with the resource object, the user interface may display a stock icon for the particular resource object. A static or stock icon is a fixed bitmap image, for example an icon representing a printer may be used to represent a printer object.

After a static or stock icon is displayed for a particular resource object, the user software will periodically read the resource object to determine whether the particular resource object has a dynamic picture associated with it that should be used to replace the icon. The existence of the dynamic picture attribute is indicated by the display picture type attribute of the resource object. If there a dynamic picture associated with a particular icon, the static or stock icon will be replaced by the dynamic picture. The dynamic picture is also a bitmap, but for example may include a scanned in photograph of a user when the resource object is a user object.

The next step 122 in the method 110 is choosing a resource object from the container selected in the previous step on which to perform an action. When the resource object is selected, at step 124 a list of all the actions that can be performed on the selected resource object are displayed by dynamically creating a menu of at least one action object identifier identifying an action that is capable of being performed on the particular type of resource object chosen in the choosing an object step 122. The actions included in the menu are determined by the list of associations between action objects and the resource object, and the operating context of the user. At step 126, the user then selects one of the actions included in the menu, and the action is performed on the resource object.

For example, a resource object may be a printer. Actions that are available to be performed on the printer may include a "view jobs" function for viewing the print jobs that are currently executing and pending at the printer, or a "view location" function, for determining a location of the printer in a building. A user would first select the printer object, then could select the "view jobs" function to determine the print status of the job. When the job was completed, the user could access the same printer object, but instead select the "view location" function to obtain a map directing the user to the printer.

In addition, a resource object may be an application. Actions that may be indicated as available to be performed on the application may include a "launch" function, an "install" function, or a "show attributes" function. By maintaining associations between the application object and the functions that may be performed on the application, maintenance and upgrades may be easily accomplished by simply accessing the application object.

At step 124, when the action is selected, a temporary file is created at the user. The temporary file stores information as to how to invoke the action object and how to locate the resource object, in addition to various display information. In one embodiment, the temporary file includes the network directory tree name where the resource object to be acted upon resides, the full distinguished name of the resource object or objects to be acted upon, the action to be performed, the type or class of resource object, the screen coordinates of the user interface window, and the screen coordinates of the icon or picture of the resource object.

At step 128, the executable is performed by passing the full path and filename of the temporary file as a command line parameter to an executable code indicated by the selected action object, and invoking the executable code. The snap-in module includes a function to simplify retrieving the path and filename of the temporary file from the command line. In some instances the executable code performs a function of a given application, and in order to execute the action the container application must first be launched.

In one embodiment, the user interface makes a call to the network library or to an application launcher, as described in the parent application, which then allocates any necessary resources necessary to run the executable code. These resources may include establishing port connections, determining drive mapping, or running startup scripts. In one embodiment, the application launcher reads the temporary file, deletes it, and causes performance of the desired action on the chosen object. The user interface periodically calls the library/launcher which checks to see if the action executable is still running. When the action executable terminates, the library/launcher cleans up any resources that were allocated.

In an alternative embodiment, the function calls an OLE (Object Linking and Embedding) or OpenDoc interface or another form of Inter-Process Communication such as DDE (Dynamic Data Exchange) to pass the required information to the action object.

Finally, the user may repeat steps 116 through 128. When the user selects another container, the user interface clears the screen and repopulates it with the objects found in the new container as discussed in connection with steps 116, 118 and 120 above. The network library contains a function to simplify changing the current context and retrieving the current context. In one embodiment, the user interface is utilized to change contexts. In an alternative embodiment context changing is performed by associating a change context action with a container object. It will be appreciated by those with skill in the art that since the associations between actions and the objects that can be performed by the actions have already been established, the user interface simply uses a combination of the modified list of actions 72 and the current context information to determine which resource objects in the new container to display.

Thus a method and apparatus has been described that facilitates the performance of actions on resource objects in a global directory computer system. An action object is provided for each of the tasks that can be performed by a resource. The action object may be provided either as a hard coded portion of the network software, or alternatively may be added to the network software by linking an external software module to the system. An association is created between the resource and the available actions that can be performed at that resource. When a resource object is selected, the tasks that can be performed by the resource object may be displayed by displaying the group of associated action objects. Thus action objects may be used to provide an enhanced user interface that reduces the time delays and frustrations associated with searching the global database.

In addition, because action objects may be added to the network by linking an external code module to the network including a number of action objects, the use of action objects provides a straightforward method of expanding the capabilities of the network. For example, assuming that a software developer developed a new task that could be performed on a printer, the software module with the new task could be linked into the network, and, when the printer object is subsequently selected, the new task is made available to the user.

Having described a preferred embodiment of the invention, it will now become apparent to one of skill in the art that other embodiments incorporating its concepts may be used. It is felt, therefore, that this invention should not be limited to the disclosed embodiment, but rather should be limited only by the spirit and scope of the appended claims.

What is claimed is:

1. A method for performing actions on resources in a global directory computer system, the resources being represented by object-oriented software objects, and the computer system having a number of users, the method comprising the steps of:

storing, in a data structure, at least one action object representing at least one action capable of being performed on a resource of the computer system.

2. The method according to claim 1, wherein said step of storing said at least one action object further comprises the step of:

providing a schema for defining classes and attributes of objects representing available resources of in said computer system;

modifying said schema to include a class of objects representing actions available in said computer system; and generating, for each of a set of executable codes, a corresponding action object representing an action performed by said executable code.

3. The method according to claim 1, further comprising the step of:

displaying to a user, upon selection of a resource object by said user, said at least one action object representing said action capable of being performed on said resource object.

4. The method according to claim 3, wherein said displaying step further comprises the step of:

displaying, responsive to said selection of said resource object, a menu, said menu comprising a plurality of action objects associated with said selected resource object.

5. The method according to claim 3, further comprising the step of:

invoking one of said action objects responsive to said one of said action objects being selected from said displayed menu.

6. The method according to claim 5, wherein said step of invoking further comprises the steps of:

storing, in a temporary file, a plurality of attributes of said selected object and said selected action object; and launching an application associated with said action object, including the step of forwarding said temporary file to said application.

7. The method according to claim 6, wherein said temporary file further comprises:

an indication as to a location of the resource object to be acted upon; and information as to how to invoke said action object.

8. The method according to claim 7, where said indication as to a location of the resource object to be acted upon further comprises:

a name of said resource object; and a class of said resource object.

9. The method according to claim 7, wherein said temporary file further comprises display information.

10. The method according to claim 9, wherein said display information further comprises:

a plurality of screen coordinates of a user interface window of said user; and a plurality of screen coordinates of a representation of said resource object.

11. The method according to claim 1, wherein said step of displaying further comprises the step of displaying an icon for each selected resource object.

12. The method according to claim 11, wherein said icon is a static icon.

13. The method according to claim 11, wherein said icon comprises a dynamic picture.

14. The method according to claim 1, further comprising the step of removing, from said list, actions not capable of being executed at said user.

15. The method according to claim 1, wherein said plurality of attributes comprises identification attributes and operation attributes.

16. The method according to claim 1 wherein said plurality of operation attributes further comprises an action attribute, for identifying at least one action to be performed by said action object.

17. The method according to claim 1, wherein said attributes further comprise a plurality of display attributes.

18. The method according to claim 17, wherein said display attributes further comprise:

an icon attribute for providing a bitmapped representation of said action object; and a dynamic picture attribute for providing an updatable bitmap representation of said action object.

19. The method according to claim 18, wherein said plurality of attributes further comprises a display picture type attribute for indicating whether said dynamic picture is available for use.

20. The method according to claim 19, wherein said step of generating said list of associations further comprises the steps of:

determining a context of operation of said user, said context of operation of said user associated with a container of a plurality of objects capable of being operated on by said user.

21. The method according to claim 20, further comprising the step of changing said context of operation of said user.

22. The method according to claim 21, wherein said context is changed responsive to said user selecting a different container.

23. The method according to claim 21, wherein said action of changing said context of operation is provided as an action object and associated with a resource object representing said context.

24. A computer system comprising:

a plurality of coupled users;

an address space for handling transactions occurring in said computer system, said address space accessible to each of said plurality of users, wherein said address space stores a plurality of object-oriented software objects available to said users, said objects including action objects and resource objects, said action objects for identifying actions that are capable of being performed on said resource objects in said address space;

means for forming associations between said resource objects and at least one of said action objects;

a schema database defining classes and attributes of obiect-oriented software objects representing globally available resources of in said computer system, means for modifying said schema to include an action object class for defining the attributes of actions available in said computer system, and means for generating, for each of a set of executable codes, a corresponding action object representing an action performed by said executable code wherein said action object is a data structure comprising identification information and operation information wherein said identification information of said action object further comprises:

a name of said action object, and a class attribute. for identifying a class of objects on which said action object may act.

25. The computer system according to claim 24, wherein said operation information further comprises an action attribute, for identifying at least one action to be performed by said action object.

26. The computer system according to claim 24, wherein said action object further includes display information.

27. The computer system according to claim 26, wherein said display information comprises:

an icon attribute for providing a visual representation of said action object; and a dynamic picture attribute for providing an updatable representation of said action object.

28. The computer system according to claim 27, wherein said plurality of attributes further comprises a display picture type attribute for determining whether said dynamic picture attribute is available for use.

29. The computer system according to claim 24, wherein said means for forming associations further comprises at each user:

a context directory for identifying a number of resource objects available to said user;

an action list for identifying a plurality of action objects that are capable of being executed by said resource objects; and an association list, generated in response to said context directory and said action list, for providing, for each of said resource objects, at least one action object capable of being performed by said resource object.

30. The computer system according to claim 29, further comprising:

means, at each user, for selecting one of said resource objects to be used by said user; and means, responsive to said step of selecting, for displaying said at least one associated action object.

31. The computer system according to claim 30 further comprising a plurality of icons, corresponding to said plurality of action objects in said action list.

32. The computer system according to claim 30, further comprising means, responsive to a selection of one of said displayed action objects, for executing said action object.

33. The computer system according to claim 32, wherein said means for executing firther comprises:

at least one application object, associated with said action object to be executed; and means for launching said application object responsive to an input received from said means for executing said action object.

34. The computer system according to claim 33, wherein said input is a temporary file comprising:

a pointer to said resource object to be acted on; and an action to be performed on said resource object.

35. The computer system according to claim 34, wherein said temporary file further comprises object identification information.

36. The computer system according to claim 35, wherein said resource object identification information further comprises:

a name of said resource object; and a class of said resource object.

37. The computer system according to claim 34, wherein said temporary file further comprises display information.

38. The computer system according to claim 37, wherein said display information further comprises:

a plurality of screen coordinates of a user interface window of said user; and a plurality of screen coordinates of a representation of said resource object.

39. The computer system according to claim 29, further comprising means for changing said context directory.

40. The computer system according to claim 39, wherein said means for changing said context directory comprises an plurality of icons corresponding to a plurality of contexts, and wherein selection of said icon changes an operating context of said user to a context associated with said selected icon.

41. The computer system according to claim 39, wherein said means for changing said context directory comprises for each object a context switching action object, said context switching action object displayed as an option when said resource object is selected, and wherein selection of said context switching action object changes an operating context of said user to a context associated with said selected context switching action.

42. The computer system according to claim 42, wherein said means for modifying said schema further comprises a code module comprising a data store and a set of routines, said data store for storing information regarding said at least one action object.

43. The computer system according to claim 42, wherein said means for generating said at least one action object further comprises a set of routines in said code module for creating action objects based on data in said modified schema and a set of executables stored in said data store of said code module.

* * * * *